United States Patent [19]

Yokota

[11] Patent Number: 5,732,302
[45] Date of Patent: Mar. 24, 1998

[54] CAMERA HAVING DEFORMABLE SHOCK DAMPENING MEMBERS

[75] Inventor: Hidetaka Yokota, Tokyo, Japan

[73] Assignee: Asahi Kagaku Kogyo Kabushiki Kaisha, Tokyo, Japan

[21] Appl. No.: 764,775

[22] Filed: Sep. 24, 1991

[30] Foreign Application Priority Data

Oct. 5, 1990 [JP] Japan .................. 2-105105

[51] Int. Cl.$^6$ .................................................. G03B 17/02
[52] U.S. Cl. ................................................. 396/535
[58] Field of Search ........................ 354/195.1, 286, 354/288, 400; 396/439, 529, 535

[56] References Cited

U.S. PATENT DOCUMENTS

| | | | |
|---|---|---|---|
| 4,032,939 | 6/1977 | Elton | 354/286 x |
| 4,226,510 | 10/1980 | Svatek | 352/31 |
| 4,290,684 | 9/1981 | Hines | 354/286 |
| 4,887,109 | 12/1989 | Fujita et al. | 354/195.12 X |
| 4,961,115 | 10/1990 | Jessop | 354/286 |
| 5,034,762 | 7/1991 | Kohmoto | 354/288 x |
| 5,045,871 | 9/1991 | Reinholdson | 354/76 |

FOREIGN PATENT DOCUMENTS

| | | |
|---|---|---|
| 8205541 | 6/1982 | Germany . |
| 57-108220 | 7/1982 | Japan . |
| 64-9434 | 1/1989 | Japan . |
| 2-54224 | 2/1990 | Japan . |
| 2186330 | 7/1990 | Japan . |
| 2183352 | 6/1987 | United Kingdom . |
| 2207252 | 1/1989 | United Kingdom . |

OTHER PUBLICATIONS

English Language Abstract of JP-2186330. P-1115 Oct. 12, 1990 vol. 14/No. 468.

*Primary Examiner*—Safet Metjahic
*Assistant Examiner*—J. K. Han
*Attorney, Agent, or Firm*—Greenblum & Bernstein, P.L.C.

[57] ABSTRACT

A camera such as a portable small-size camera includes a structural body composed of a plurality of integrally coupled functional components, including a lens barrel, an automatic focusing device, a viewfinder, and a stroboscopic flash unit, a cover enclosing the structural body, and a plurality of slender rods extending between the structural body and the cover. The structural body is supported by the cover through the slender rods. The slender rods are rigid enough to position the structural body and the cover with respect to each other, and flexible enough to be elastically deformable when shocks are applied thereto.

9 Claims, 1 Drawing Sheet

U.S. Patent  Mar. 24, 1998  5,732,302 ns No. 2-105105 (filed on Oct. 5, 1990) which is expressly incorporated herein by reference in its entirety.

CAMERA HAVING DEFORMABLE SHOCK DAMPENING MEMBERS

The present disclosure relates to subject matter contained in Japanese utility model application No. 2-105105 (filed on Oct. 5, 1990) which is expressly incorporated herein by reference in its entirety.

BACKGROUND OF THE INVENTION

1. Field of the Invention

The present invention relates to a camera, and more particularly to a camera having a cover.

2. Description of the Relevant Art

Many cameras have a structural body comprising a plurality of securely coupled functional components including a lens barrel, a viewfinder, a stroboscopic flash unit, an automatic focusing device, etc., and a cover that en-closes the structural body.

Some of these cameras have a frame of light alloy or the like in the structural body, with the functional components coupled thereto. The cover, which is made of metal or synthetic resin, is directly screwed to the frame. In other cameras, some functional components, e.g., a lens barrel, are supported on the cover itself.

However, since the structural body and the cover are rigidly connected to each other in these cameras, any external shocks that may be applied to the cover are directly transmitted to the functional components.

More specifically, when the camera that is carried by the user falls or hits a hard object, the shock is transmitted to the functional components, tending to damage or impair those functional components which are particularly sensitive to shocks, even if the cover remains intact.

SUMMARY OF THE INVENTION

In view of the aforesaid problems found in conventional cameras, it is an object of the present invention to provide a camera which is of a shock-resistant structure for preventing shocks applied to a camera cover from being transmitted to functional components of the camera.

According to the present invention, there is provided a camera comprising a structural body composed of a plurality of integrally coupled functional components, a cover enclosing the structural body, and a plurality of slender members extending between the structural body and the cover. The structural body is supported by the cover through the slender members, the slender members being rigid enough to position the structural body and the cover with respect to each other, and flexible enough to be elastically deformable when shocks are applied thereto.

When shocks are applied to the cover, the slender members that interconnect the cover and the structural body are elastically deformed or flexed, thereby dampening the applied shocks. Therefore, the shocks applied to the cover are prevented from being transmitted to the structural body. The functional components of the structural body are protected against damage. The camera according to the present invention is thus highly resistant to shocks.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
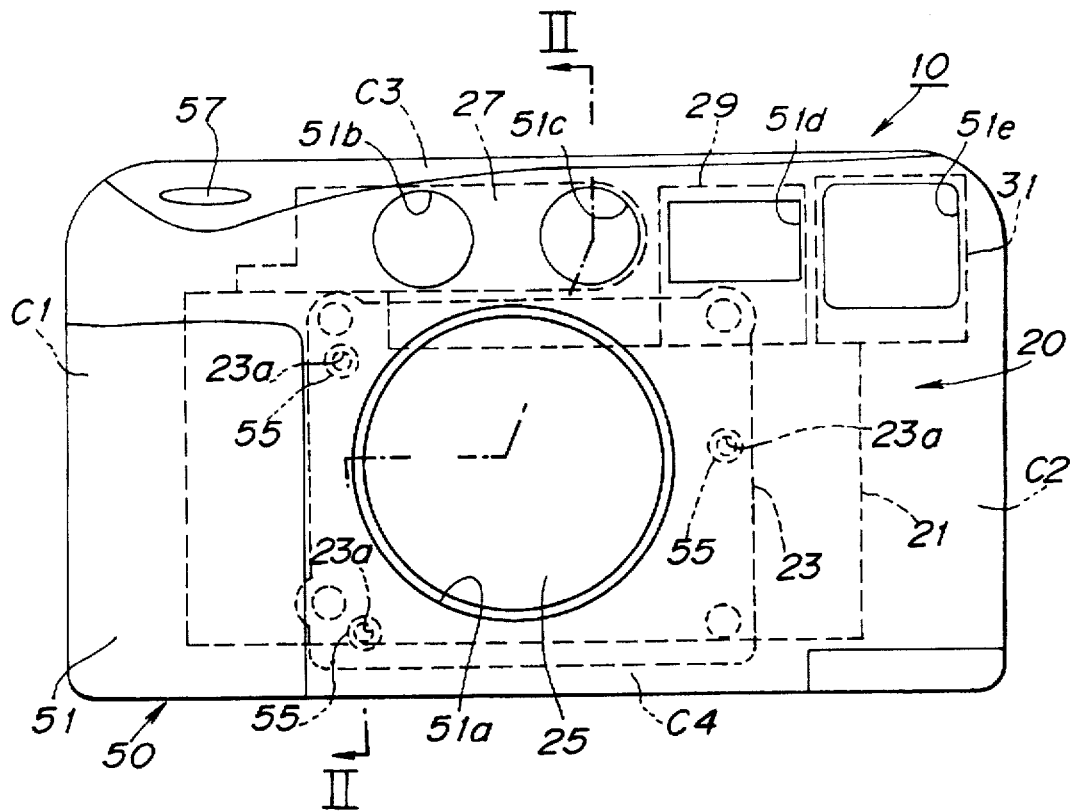
FIG. 1 is a front elevational view of a camera according to the present invention.
Figure 2:
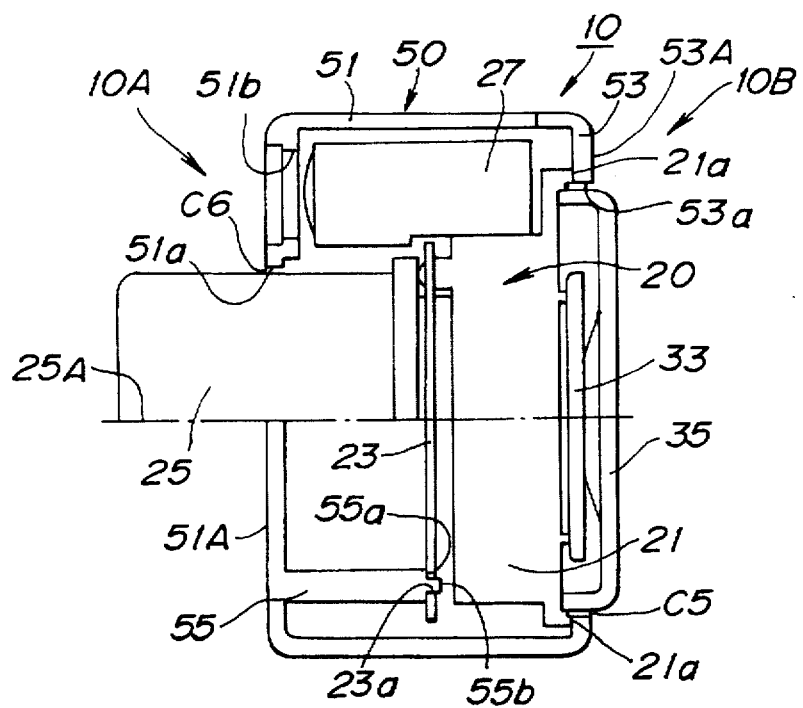
FIG. 2 is a cross-sectional view taken along line II—II of FIG. 1.

FIG. 1 shows a camera, generally designated by the reference numeral 10, according to the present invention. The camera 10 is in the form of a portable small-size camera, and has a structural body 20 and a cover 50. In FIG. 2, the camera 10 includes a front section 10A and a rear section 10B.

The structural body 20 comprises a frame 21, a base plate 23 disposed in front of the frame 21, and a lens barrel 25 disposed in front of the base plate 23. The frame 21, the base plate 23, and the lens barrel 25 are securely fastened together by set screws.

The frame 21 comprises a housing positioned centrally in the camera and includes film cartridge chambers defined in respective horizontally spaced opposite ends thereof for loading, winding, and rewinding a photographic film. The frame 21 also has a guide disposed between the film cartridge chambers for positioning the film in a focus plane.

The base plate 23, which comprises a metal plate, serves as a bracket of the structural body 20 by which the structural body 20 is coupled to the cover 50.

The lens barrel 25 houses a lens system composed of one or more lenses, a lens actuating mechanism, a diaphragm, and a shutter mechanism. The lens barrel 25, and hence the lens system supported therein have an optical axis 25A.

The structural body 20 also comprises an automatic focusing device 27, a viewfinder 29, and a stroboscopic flash unit 31 that are all mounted on the upper end of the frame 21, and a rear lid 35 openably and closably pivotally attached to the rear surface of the frame 21 and having a film pressure plate 33. The photographic film can be loaded into and unloaded from the film cartridge chambers when the rear lid 35 is opened.

The lens barrel 25, the automatic focusing device 27, the viewfinder 29, the stroboscopic flash unit 31, and other components of the structural body 20 serve as structural components of the camera. These structural components are securely coupled together by the frame 21 and the base plate 23, which therefore serve as a frame assembly for interconnecting the structural components.

The cover 50 comprises a front cover member 51 and a rear cover member 53 that are fastened to each other by set screws. Lefthand and righthand sides of the cover 50 and lefthand and righthand sides of the structural body 20 are spaced from each other by respective clearances C1, C2, and upper and lower surfaces of the cover 50 and upper and lower surfaces of the structural body 20 are spaced from each other by respective clearances C3, C4.

The front and rear cover members 51, 53 may be made of synthetic resin such as ABS resin, for example.

The front cover member 51 includes a front panel 51A that includes a lens barrel hole 51a through which the lens barrel 25 projects.

A plurality of (three in the illustrated embodiment) slender rods 55 that are circumferentially spaced around the lens barrel hole 51a integrally project rearwardly from the inner surface of the front panel 51A of the front cover member 51 in a direction parallel to the optical axis 25A.

Each of the rods 55 has a step 55a and a small-diameter projection 55b on the rear end. The small-diameter projections 55b of the rods 55 are inserted in respective apertures 23a defined in the base plate 23 whose front surface engages the steps 55a of the rods 55. In this manner, the structural body 20 and the cover 50 are positioned relatively to each other, and the structural body 20 is supported by the cover 50 through the rods 55.

The rods 55, which are circular in cross section, are rigid enough to position the structural body 20 and the cover 50 with respect to each other, and flexible enough to be elastically deformable when shocks are applied thereto.

The front panel 51A of the front cover member 51 has a first rangefinder window 51b defined therein for passing therethrough a beam emitted from the light-emitting element of the automatic focusing device 27 for measuring the distance to the subject to be photographed. A second rangefinder window 51c defined therein detects a beam spot formed on the subject by the beam from the first rangefinder window 51b. A viewfinder window 51d defined therein provides a field of view for the viewfinder 29, and a stroboscopic flash window 51e defined therein passed therethrough flash light emitted by the stroboscopic flash unit 31. The front cover member 51 supports a shutter release button 57 thereon.

The rear cover member 53 has a central opening 53a defined therein from which the rear lid 35 projects rearwardly, and a rear panel 53A having a viewfinder window (not shown) through which the user of the camera 10 looks into the viewfinder 29.

The rear panel 53A has an inner surface held against the end surface of a flange 21a projecting rearwardly from the frame 21, the flange 21a being slidable against the inner surface of the rear panel 53A in a direction normal to the direction in which the rods 55 extend, i.e., the optical axis 25A. The abutting engagement between the rear panel 53A and the flange 21A prevents the structural body 20 from moving toward the rear panel 53A, thereby holding the projections 55b of the rods 55 within the holes 23a for protection against dislodgement therefrom.

The structural body 20 is sandwiched between the rods 55 and the rear panel 53A against movement with respect to the cover 50 along the optical axis 25A.

The inner edge of the rear cover member 53 which defines the central opening 53a is spaced from the outer edge of the rear lid 35 by a clearance C5, and the outer circumferential surface of the lens barrel 25 and the inner edge of the front cover member 51A which defines the lens barrel hole 51a are spaced from each other by a clearance C6. Since the rear cover member 53 and the flange 21a of the frame 21 are slidable relatively to each other, as described above, when the rods 55 are elastically deformed, the structural body 20 can be displaced with respect to the cover 50 in the direction normal to the direction in which the rods 55 extends, or along the optical axis 25A.

When shocks are applied to the cover 50 vertically or laterally of the camera transversely to the optical axis 25A, the rods 55 are elastically deformed or flexed, thereby dampening the shocks. Consequently, the shocks are prevented from being directly transmitted to the structural body 20, which is composed of the structural components of the camera 10.

Inasmuch as the camera 10 is a portable small-size camera in the illustrated embodiment, the user may inadvertently drop the camera 10 when the strap connected to the camera slips off the hand, for example. When the camera 10 falls off the hand of the user, a large shock is applied to the camera 10. However, the illustrated shock-resistance structure is effective to dampen the shock applied to the camera 10.

In the above embodiment, the lens barrel 25, the automatic focusing device 27, the viewfinder 29, the stroboscopic flash unit 31, and other functional components are attached to the frame assembly, which is composed of the frame 21 and the base plate 23, for shock resistance. However, not all those functional components need be coupled to the frame assembly. For example, if the viewfinder is of a simple structure and is not required to be protected against shocks, it may be attached to the cover.

Therefore, the structural body may be composed of only those functional components which are highly sensitive to shocks and should be highly resistant to shocks.

The rods 55 need not be integral with the front cover member 51, but may be separate from and mounted on the front cover member 51.

Alternatively, the rods 55 may be replaced with slender members that are functionally equivalent to the rods 55, the slender members being integral with one of the functional components of the structural body 20 or the rear cover member 53. The rods 55 or alternative slender members may be positioned or oriented as desired.

Although a certain preferred embodiment of the present invention has been shown and described in detail, it should be understood that various changes and modifications may be made therein without departing from the scope of the appended claims.

What is claimed is:

1. A camera comprising:
   a structural body comprising a plurality of integrally coupled functional components including a lens barrel having an optical axis;
   a cover enclosing said structural body;
   a plurality of slender members extending in parallel to said optical axis of said lens barrel and between said structural body and said cover, said structural body being supported by said cover through said slender members; and
   said slender members being sufficiently rigid to position said structural body and said cover in a substantially fixed relationship with respect to each other, and sufficiently flexible to be elastically deformable to dampen shocks when shocks are applied thereto.

2. A camera according to claim 1, wherein said lens barrel is located in a front portion of said structural body, said cover including a front panel having a lens barrel hole defined therein, said lens barrel extending through said lens barrel hole, said slender members being disposed around said lens barrel between said front panel and said structural body.

3. A camera according to claim 1, wherein said structural body includes a frame assembly, said functional components being mounted on said frame assembly, said slender members being located between said frame assembly and said cover.

4. A camera according to claim 1, wherein said structural body includes a frame assembly, said functional components being mounted on said frame assembly, and said functional components include a lens barrel located in a front portion of said structural body, said cover including a front panel having a lens barrel hole defined therein, said lens barrel extending through said lens barrel hole, said slender members being disposed around said lens barrel between said front panel and said frame assembly.

5. A camera according to claim 4, wherein said structural body includes a rear lid disposed remotely from said lens barrel and openable for loading and unloading a film, said cover including a rear panel having an opening defined therein, said rear lid projecting through said opening, said structural body being supported by said slender members and said rear panel of the cover against movement with respect to said cover in a direction along an optical axis of said lens barrel.

6. A camera according to claim 1, wherein said slender members are integral with said cover.

7. A camera according to claim 1, wherein said functional components include a frame, a lens barrel located in front of said frame, an automatic focusing device mounted on said frame, a viewfinder mounted on said frame, and a stroboscopic flash unit mounted on said frame.

8. A camera according to claim 1, wherein said structural body and said cover are spaced from each other by a clearance in a direction normal to the direction in which said slender members extend between said structural body and said cover.

9. A camera according to claim 1, wherein said slender members extend parallel to each other.

* * * * *

UNITED STATES PATENT AND TRADEMARK OFFICE
CERTIFICATE OF CORRECTION

PATENT NO. : 5,732,302
DATED : March 24, 1998
INVENTOR(S) : Hidetaka YOKOTA

It is certified that error appears in the above-indentified patent and that said Letters Patent is hereby corrected as shown below:

On the cover page column 2, paragraph [56] References, line 2, after "57-108220" insert ---63-206638 2/1990 Japan---.

Signed and Sealed this

Twentieth Day of October, 1998

Attest:

BRUCE LEHMAN

Attesting Officer

Commissioner of Patents and Trademarks